United States Patent
Schaefer et al.

(10) Patent No.: US 11,960,360 B1
(45) Date of Patent: Apr. 16, 2024

(54) REDUNDANCY-BASED ERROR DETECTION IN A MEMORY DEVICE

(71) Applicant: Micron Technology, Inc., Boise, ID (US)

(72) Inventors: Scott E. Schaefer, Boise, ID (US); Aaron P. Boehm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/934,452

(22) Filed: Sep. 22, 2022

(51) Int. Cl.
*G06F 11/00* (2006.01)
*G06F 11/07* (2006.01)
*G06F 11/10* (2006.01)

(52) U.S. Cl.
CPC ...... *G06F 11/1068* (2013.01); *G06F 11/0772* (2013.01); *G06F 11/0793* (2013.01)

(58) Field of Classification Search
CPC ............. G06F 11/1068; G06F 11/0772; G06F 11/0793
See application file for complete search history.

(56) References Cited

U.S. PATENT DOCUMENTS

| | | | | |
|---|---|---|---|---|
| 2006/0288177 A1* | 12/2006 | Shaw | ...................... | G06F 11/10 711/162 |
| 2010/0287433 A1* | 11/2010 | Mu | ...................... | G06F 11/1666 711/E12.008 |
| 2017/0031787 A1* | 2/2017 | Dell | ........................ | G06F 3/061 |

* cited by examiner

*Primary Examiner* — Christine T. Tu
(74) *Attorney, Agent, or Firm* — Holland & Hart LLP

(57) ABSTRACT

Methods, systems, and devices for redundancy-based error detection in a memory device are described. A memory device may read multiple copies of a codeword from memory and generate for each codeword copy an error detection bit that indicates whether the memory device detected an error in that codeword. Additionally, the memory device may compare the codeword copies and generate one or more match bits that indicate whether corresponding portions of the codewords match. Using a combination of the error detection bits and the match bits, the memory device may determine the error status of each codeword.

25 Claims, 10 Drawing Sheets

US 11,960,360 B1

REDUNDANCY-BASED ERROR DETECTION IN A MEMORY DEVICE

FIELD OF TECHNOLOGY

The following relates to one or more systems for memory, including enhanced redundancy-based error detection in a memory device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A memory device may use an on-device error correction technique (e.g., an error correction code (ECC)) to detect and potentially correct errors in codewords stored in the memory device. But the on-device error correction technique, such as the ECC, may not support error classification (e.g., to define which types of errors are in the codewords). Further, the on-device error correction technique, such as the ECC, may be limited (e.g., for overhead reasons) to detecting a threshold quantity of errors per codeword (which may be referred to as ECC power, among other terminology), which means that the on-device error correction technique, such as the ECC, may be unable to detect errors in excess of the threshold quantity. In certain high-reliability applications (e.g., in automotive safety), techniques for determining the error status of codewords, including codewords with errors in excess of the threshold quantity of errors per codeword (e.g., the ECC power), may be desired.

According to the techniques described herein, a memory device may determine the error status of codewords (including codewords with errors in excess of the ECC power) by storing redundant copies of the codewords and generating error information bits for the codewords. For example, the memory device may generate, for each codeword copy, an error detection bit that indicates whether the memory device detected one or more errors in that codeword. Additionally, the memory device may compare the redundant copies of the codewords and generate one or more of A) a data match bit that indicates whether the data bits of the codewords match, or B) a parity match bit that indicates whether the parity bits of the codewords match. Using the error information bits (e.g., the error detection bits or the match bits or both), the memory device may determine the error status of each codeword, which may be provided in some form to a host device so that the host device can initiate appropriate action.

Features of the disclosure are initially described in the context of systems and dies as described with reference to FIGS. 1 and 2. Features of the disclosure are described in the context of memory devices and process flows as described with reference to FIGS. 3 through 6. These and other features of the disclosure are further illustrated by and described with reference to an apparatus diagram and flowcharts that relate to redundancy-based error detection in a memory device as described with reference to FIGS. 7 through 10.

Figure 1:
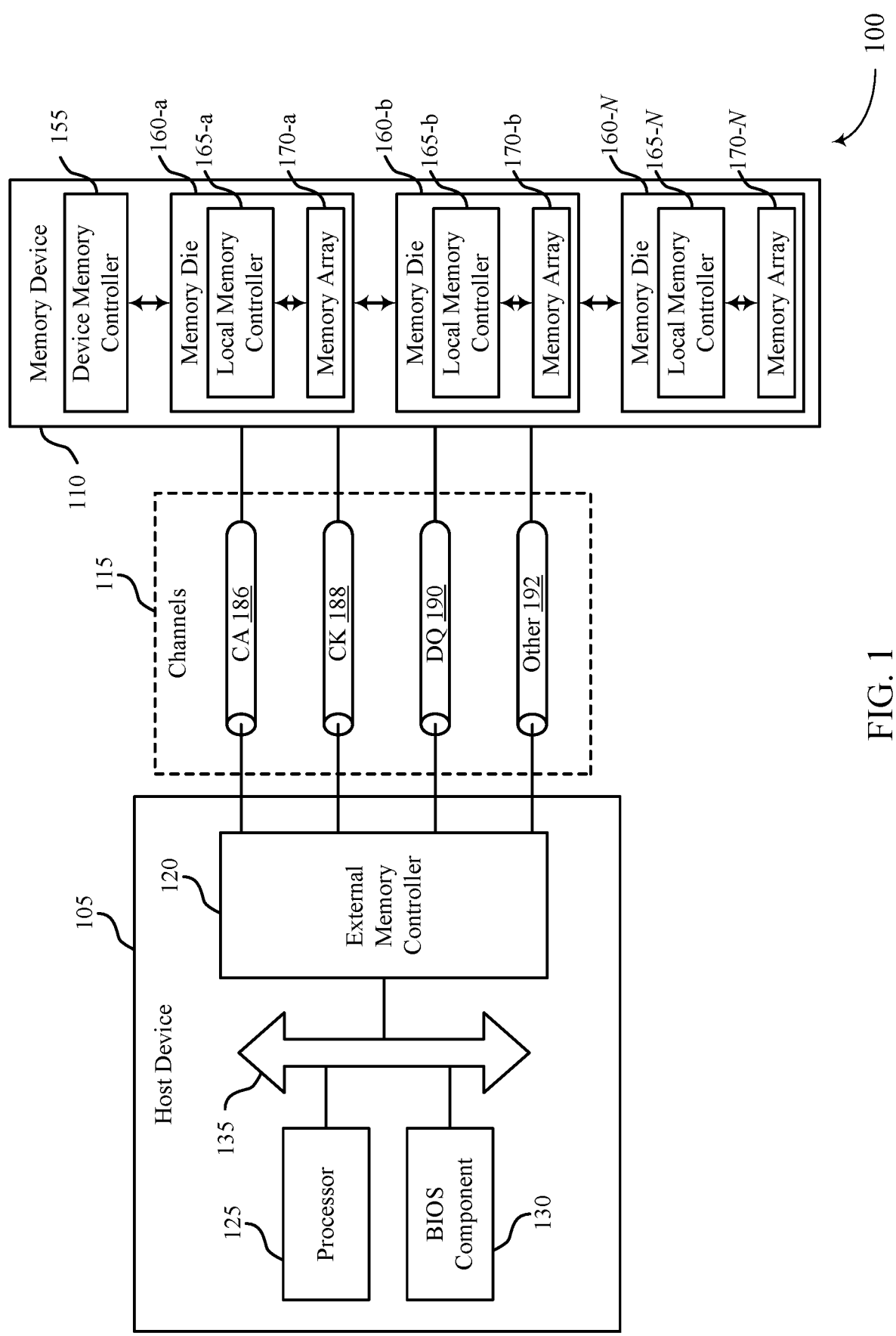
FIG. 1 illustrates an example of a system that supports redundancy-based error detection in accordance with examples as disclosed herein.

FIG. 1 illustrates an example of a system 100 that supports redundancy-based error detection in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A memory device may use an on-device error correction technique to detect and potentially correct errors in information stored in the memory device. For example, a memory device may use on-device ECC to detect and correct single bit errors (SBEs) that arise in stored codewords. A codeword may refer to a combination of data bits and parity bits that are generated based on the data bits. For example, each parity bit in a codeword may be generated by exclusive-ORing (XORing) a subset of the data bits according to the error correction code.

As memory devices shrink in size, greater quantities of memory cells (which may have smaller areas for storing charge) may be retention-challenged because the data stored by the memory cells may become compromised unless the memory cells are frequently refreshed. But applying frequent refresh operations to ensure the integrity of data in retention-challenged cells may undesirably increase the power consumption of the memory. To save power, a memory device may apply refresh operations less frequently and use error correction, such as ECC, to detect and correct errors that arise from retention-challenged memory cells. But using ECC for retention-challenged memory cells may prevent the memory device from detecting additional errors (e.g., errors that exceed the ECC power) that arise during operation of the memory device.

To enable detection and classification of errors (including errors in excess of the ECC power), a memory device 110 may generate and store multiple copies of a codeword for a set of data bits. For example, the memory device 110 may store A) a first codeword that includes a first set of parity bits and a first copy of a set of data bits, and B) a second codeword that includes a second set of parity bits and a second copy of the set of data bits. Upon reading the codewords, the memory device may generate error information bits based on the codewords. For example, the memory device may generate error detection bits that indicate whether the memory device detected errors in the codewords. Additionally, the memory device generate one or more of A) a data match bit that indicates whether the data bits of the codewords match, and B) a parity match bit that indicates whether the parity bits of the codewords match. The memory device may then use the error information bits to determine the error statuses of the codewords. Such a technique may allow the memory device to detect and classify errors in excess of the ECC power without increasing the ECC power (which may be associated with increased overhead), among other benefits.

Figure 2:
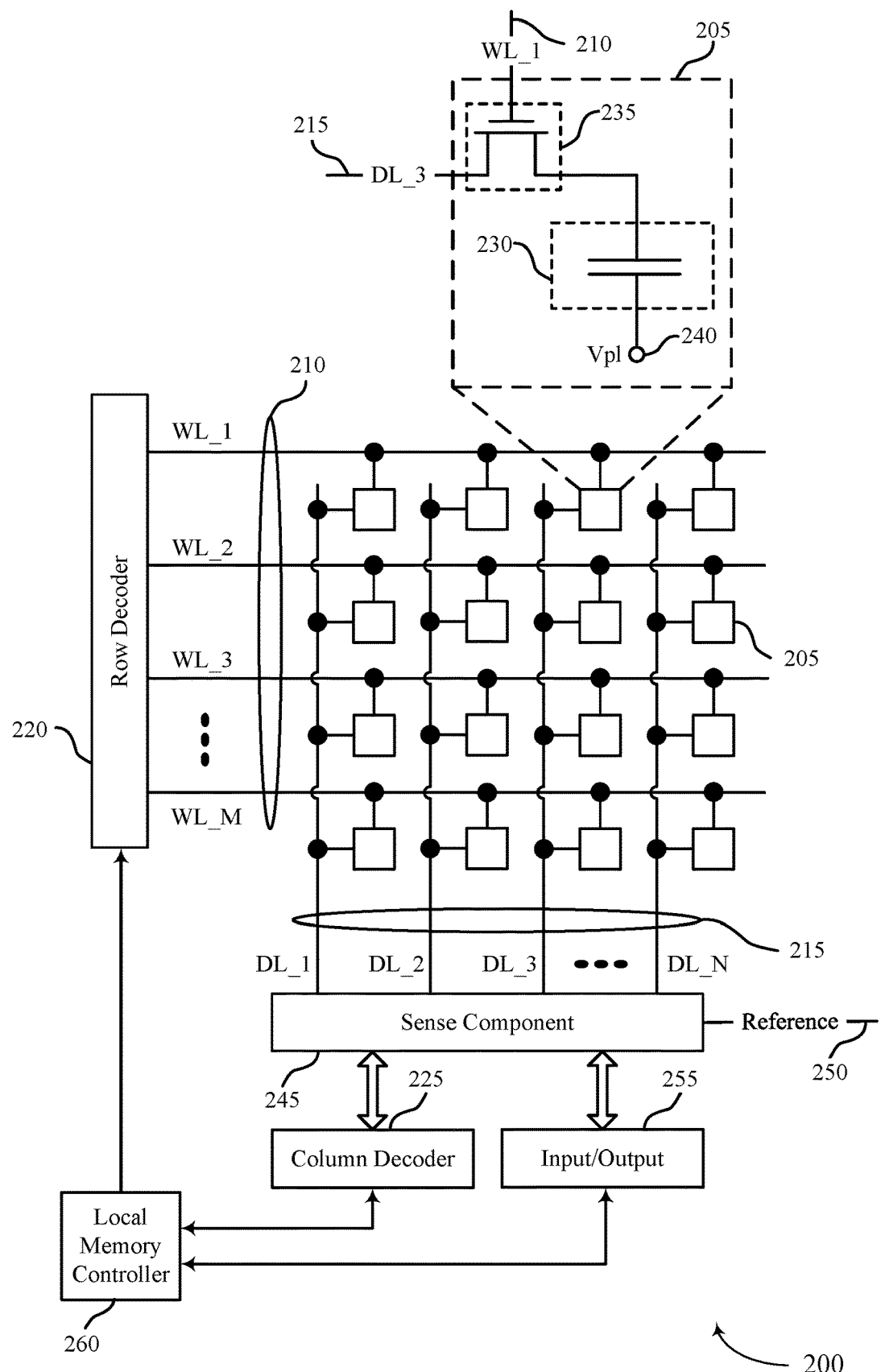
FIG. 2 illustrates an example of a memory die that supports redundancy-based error detection in accordance with examples as disclosed herein.

FIG. 2 illustrates an example of a memory die 200 that supports redundancy-based error detection in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

To improve the reliability of information stored in the memory die 200, the memory device that includes the memory die 200 may implement the techniques described herein that enable detection of errors in the stored information (including errors in excess of the ECC power). For example, the memory device may store a first codeword for a first copy of a set of data bits and a second codeword for a second copy of the set of data bits. Storing redundant copies of the codewords may allow the memory device to detect if one of the codewords has an error during a read operation (e.g., by comparing the codewords). However, without more information, the memory device may be unable to distinguish which codeword has the error. For example, the memory device may determine that one codeword (or one section of the memory array) has an error but may not be able to identify which codeword (or section of the memory array) has the error). Although storing a third copy of the codeword (a technique referred to as a triple-redundancy technique) might allow the memory device to distinguish additional error information, storing three copies of a codeword may increase storage overhead and processing complexity, among other drawbacks.

According to the present disclosure, a memory device may improve (relative to other techniques) the ability of the memory device to determine error information for stored information by implementing a pseudo-triple-redundancy technique, which may also be referred to as an enhanced redundancy technique. In the pseudo-triple-redundancy technique, the memory device may store two copies of a codeword and use the two copies to generate error information bits (e.g., error detection bits, a data match bit, a parity match bit) that indicate the error statuses of the codewords. The memory device may provide the error information bits (or the error statuses themselves) to a host device so that the host device can take appropriate action.

Figure 3:
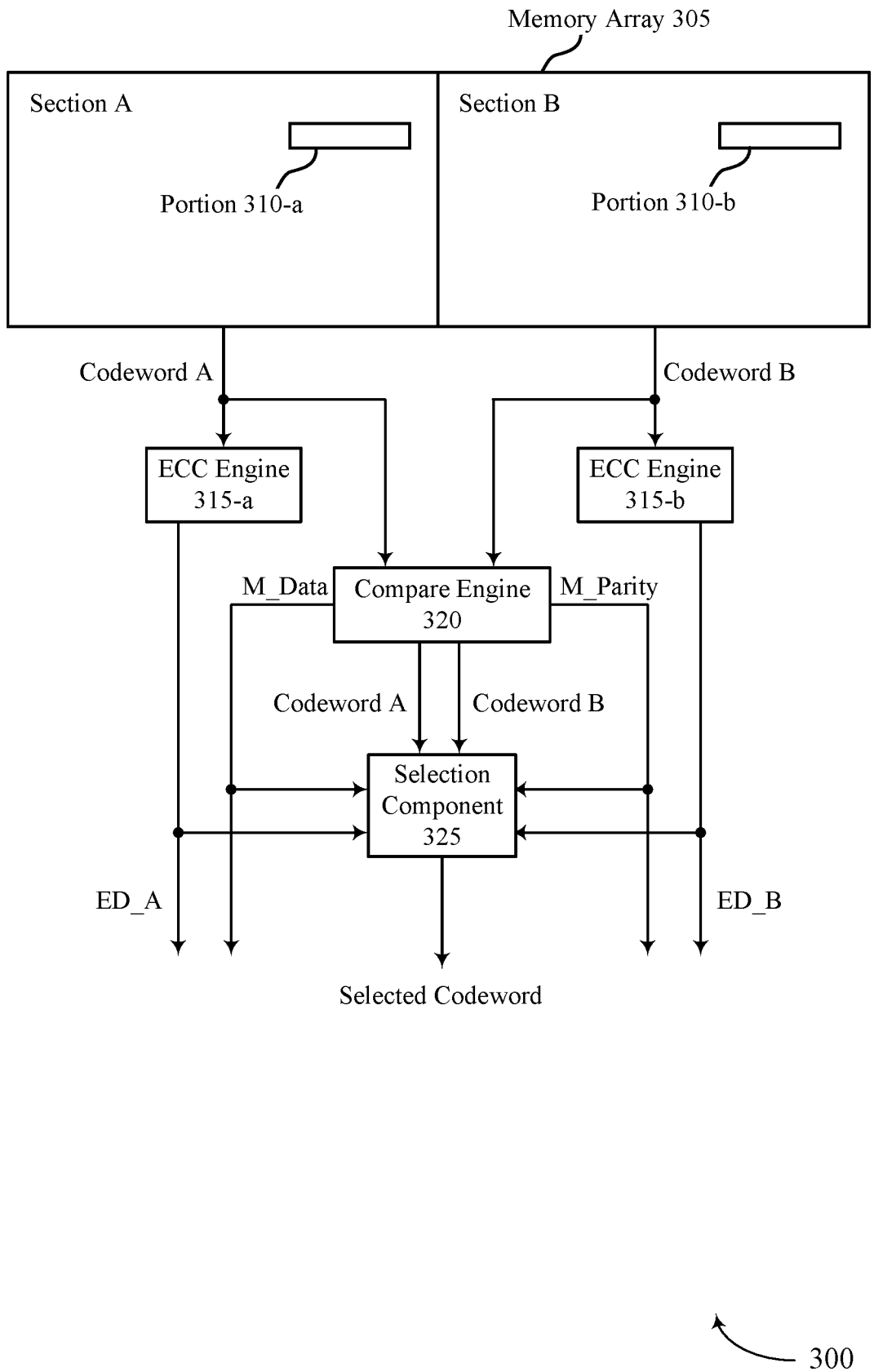
FIG. 3 illustrates an example of a memory device that supports redundancy-based error detection in accordance with examples as disclosed herein.

FIG. 3 illustrates an example of a memory device 300 that supports redundancy-based error detection in accordance with examples as disclosed herein. The memory device 300 may be an example of a memory device as described herein. The memory device 300 may store redundant copies (e.g., one or more redundant copies) of codewords and use the codewords to generate error information bits that indicate the error statuses of the codewords. The memory device 300 may be configured to support ECC decoding and codeword comparison in parallel (e.g., at least partially overlapping times), which may decrease the latency of the process relative to memory devices (e.g., memory device 500) that support serial ECC decoding and codeword comparison. The configuration of the memory device 300 may be referred to as the parallel configuration.

At a high level, the memory device 300 may store redundant copies of a codeword in the memory array. In response to a read command, the memory device 300 may read the codewords and input the codewords into the ECC engines 315 and the compare engine 320 so that the memory device 300 can perform ECC decoding and codeword comparison in parallel (e.g., at partially or wholly overlapping times). The ECC engines 315 may generate error detection bits and the compare engine 320 may generate match bits (e.g., a data match bit, a parity match bit) that together indicate the error statuses of the codewords. The selection component 325 may use the error information bits to select one of the codewords for communication to the host device. In some examples, the selection component 325 may be a controller or logic.

The memory device 300 may include a memory array 305 that is configured to store information, such as codewords. The memory array 305 may be divided into two sections (e.g., section A and section B) and may be configured to perform the same access operation on the sections, potentially concurrently (e.g., at wholly or partially overlapping times). For example, the memory array 305 may be configured to write a first codeword (e.g., codeword A) to portion 310-a and a second codeword (e.g., codeword B) to portion 310-b. The first codeword may include 1) a first set of data bits (data A) representative of a first copy of a set of data and 2) a first set of parity bits (parity A). The second codeword may include 1) a second set of data bits (data B) representative of a second copy of the set of data and 2) a second set of parity bits (parity B). The same set of parity bits (e.g., generated based on data A or data B) may be used for parity A and parity B. Alternatively, parity A and parity B may be separately generated (e.g., parity A may be generated based on data A whereas parity B may be generated based on data B).

Although described with reference to a single memory array, the pseudo-triple redundancy techniques described herein can be implemented using multiple memory arrays. For example the first codeword (codeword A) may be stored in a first memory array and the second codeword (codeword B) may be stored in a second memory array. Other configurations for storing the codewords are contemplated and within the scope of the present disclosure.

An ECC engine 315 may be configured to perform ECC decoding on a codeword and to generate an error detection bit based on the ECC decoding. For example, an ECC engine 315 may perform ECC decoding to detect and correct an error in a codeword (if an error is present). The ECC engine 315 may also generate an error detection bit whose value indicates whether the ECC engine 315 detected an error in the codeword. For instance, an error detection bit with value '0' may indicate that the ECC engine 315 did not detect an error in the codeword whereas an error detection bit with value '1' may indicate that the ECC engine did detect an error in the codeword. An error detection bit may also be referred to as a syndrome check bit, an error check bit, or other suitable terminology. The ECC engines 315 may be configured to detect and correct single bit errors. Correcting an error in a codeword may refer to inverting the bit that is in error before communicating the codeword to another component of the memory device (and may not involve correction of the error in the memory array 305).

So, ECC engine 315-a may perform ECC decoding on codeword A and may generate error detection bit A (ED_A) for codeword A based on the ECC decoding. Similarly, ECC engine 315-b may perform ECC decoding on codeword B and may generate error detection bit B (ED_B) for codeword B based on the ECC decoding. Error detection bit A and error detection bit B may be communicated to the selection component 325 so that the selection component 325 can use the error detection bits as a basis for selecting one of codeword A and codeword B for returning to the host device.

In some examples, the error detection bit for a codeword may be generated based on the syndrome bits for a codeword. For instance, the error detection bit for a codeword may be generated by ORing the syndrome bits for the codeword, which may be generated by XORing each stored parity bit with a corresponding parity bit generated from read data bits of the codeword. For example, the stored parity bit P0 may be XORed with the generated parity bit P0, the stored parity bit P1 may be XORed with the generated parity bit P1, and so on and so forth, to generate syndrome bits for codeword. The syndrome bits resulting from the XOR operations may be ORed so that the resulting error detection bit indicates whether an error has been detected in the codeword.

The compare engine 320 may be configured to compare codewords received from the memory array 305. For example, the compare engine 320 may be configured to compare codeword A and codeword B. Comparing codeword A and codeword B may refer to comparing data A with data B, comparing parity A with parity B, or both. So, the compare engine 320 may compare one or more portions of codeword A with one or more corresponding portions of codeword B. Comparing the codewords may allow the compare engine 320 to determine whether there is a mismatch between the bits in the codewords.

The compare engine 320 may generate a data match bit (M_Data) that indicates whether there is a mismatch between data A and data B, may generate a parity match bit (M_Parity) that indicates whether there is a mismatch between parity A and parity B, or both. If there is a mismatch in the data bits (e.g., a mismatch between data A and data B), the compare engine 320 may generate data match bit (M_Data) with value '1.' If the data bits match (e.g., if each bit in data A has the same value as a corresponding bit in data B), the compare engine 320 may generate data match bit (M_Data) with value '0.' If there is a mismatch in the parity bits (e.g., a mismatch between parity A and parity B), the compare engine 320 may generate parity match bit (M_Parity) with value '1.' If the parity bits match (e.g., if each bit in parity A has the same value as a corresponding bit in parity B), the compare engine 320 may generate parity match bit (M_Parity) with value '0.' The data match bit, the parity match bit, or both, may be communicated to the selection component 325 so that the selection component 325 can use the match bit(s) as a basis for selecting one of codeword A and codeword B for returning to the host device.

In some examples, the memory device 300 may count the quantity of mismatches between portions of a codeword. For example, the memory device 300 may count the quantity of mismatches (e.g., data bits with the same bit-position but different values) between data A and data B. Additionally or alternatively, the memory device 300 may count the quantity of mismatches (e.g., parity bits with the same bit-position but different values) between parity A and parity B. The quantity of mismatches per codeword may be used to provide additional insight into the reliability and functionality of the memory array 305.

The memory device 300 (e.g., via the selection component 325) may use the error information bits to determine the error statuses for the codewords. For example, the memory device 300 may use Table 1, the error detection bits, the data match bit, and the parity match bit to determine the error status of codeword A and the error status of codeword B.

TABLE 1

Error Status Based on Error Information Bits for Parallel Configuration

| M_Data | M_Parity | ED_A | ED_B | A Status | B Status |
|---|---|---|---|---|---|
| 0 | 0 | 0 | 0 | Codeword A error-free | Codeword B error-free |
| 0 | 0 | 0 | 1 | Codeword A error-free | Codeword B unknown |
| 0 | 0 | 1 | 0 | Codeword A unknown | Codeword B error-free |
| 0 | 0 | 1 | 1 | Codeword A unknown | Codeword B unknown |
| 0 | 1 | 0 | 0 | Data A error-free, parity A unknown | Data B error-free, parity B unknown |
| 0 | 1 | 0 | 1 | Data A error-free, parity A error-free | Data B error-free, parity B error(s) |
| 0 | 1 | 1 | 0 | Data A error-free, parity A error(s) | Codeword B error-free |
| 0 | 1 | 1 | 1 | Data A error-free, parity A error(s) | Data B error-free, parity B error(s) |
| 1 | 0 | 0 | 1 | Codeword A error-free | Data B error(s), parity B error-free |
| 1 | 0 | 1 | 0 | Data A error(s), parity A error-free | Codeword B error-free |
| 1 | 0 | 1 | 1 | Data A error(s), parity A error-free | Data B error(s), parity B error-free |
| 1 | 1 | 0 | 1 | Codeword A error-free | Data B error(s), parity B error(s) |
| 1 | 1 | 1 | 0 | Data A error(s), parity A error(s) | Codeword B error-free |
| 1 | 1 | 1 | 1 | Data A error(s), parity A error(s) | Data B error(s), parity B error(s) |

The parallel configuration of the memory device 300 may allow the memory device 300 to determine the error statuses of the codewords more quickly (with lower latency) than alternative configurations, such as the serial configuration described with reference to FIG. 5. However, the error status information provided by the parallel configuration may be less comprehensive than the error status information provided by the serial configuration, which may result in reduced diagnostic coverage and/or the memory device 300 complying with fewer data requests relative to a memory device with the serial configuration.

In some examples, the selection component 325 may use Table 1 to select between the codewords for communication to the host device. For example, the selection component 325 may determine whether to communicate data A from codeword A or data B from codeword B. If neither codeword has an error, the selection component 325 may select either codeword for communication to the host device. If codeword A is error-free and the error status of codeword B is unknown, the memory device 300 may select codeword A for communication (and vice versa). If the error status of both codewords is unknown, the memory device may 1) select either codeword for communication and indicate the error status(es) of the codeword(s), or 2) select neither codeword for communication and may communicate an error flag instead. If codeword A is error-free and codeword B has an error, the memory device 300 may select codeword A for communication (and vice versa). If data A and data B are each error-free but parity A and parity B each have one or more errors, the memory device may select either codeword for communication. If both codewords have one or more error(s), the memory device may 1) select either codeword for communication and indicate the error status(es) of the codeword(s), or 2) select neither codeword for communication and may communicate an error flag instead.

In addition to communicating the selected data to the host device, the memory device 300 may communicate or otherwise provide an indication of the error status of one or both of the codewords to the host device. In some examples, the memory device 300 may provide the error status(es) by writing the error status(es) to one or more mode registers at the memory device 300 for the host device to read. In other examples, the memory device 300 may provide the error status(es) by writing the error information bits to one or more mode registers at the memory device 300 for the host device to read. The host device may read the mode register(s) periodically or in response to a trigger condition (e.g., receipt of a prompt from the memory device 300).

In some examples, the memory device 300 may provide the error status(es) by transmitting the error status(es) to the host device (e.g., via a communication bus between the memory device 300 and the host device). In other examples, the memory device 300 may provide the error status(es) by transmitting the error information bits to the host device (e.g., via a communication bus between the memory device 300 and the host device).

The host device may determine the error status(es) of the codewords based on the indication of the error status(es) provided by the memory device 300 and may take one or more actions based on the error status(es). For example, if the error status(es) indicate that the data received by the host device is error-free, the host device may process the data. If the error status(es) indicate that the received data has an error (e.g., an uncorrectable error), the host device may discard the data and enter a safety mode. An uncorrectable error may refer to a quantity of errors that is in excess of the ECC power. For example, if the ECC engines 315 are configured to detect and correct single bit errors, an uncorrectable error may refer to a multi-bit error. If the error status(es) indicate that one of the codewords had an error, the host device may record the address associated with that codeword as part of an error-logging process for ensuring the reliability of the memory device 300. For example, the host device may retire (e.g., no longer use) a portion (e.g., a row) of memory if a threshold quantity of errors accumulate in the row. Other actions by the host device are contemplated and within the scope of the present disclosure.

Thus, the memory device 300 may determine the error statuses of the codewords by storing redundant copies of codewords and using the codewords to generate error information bits.

Figure 4:
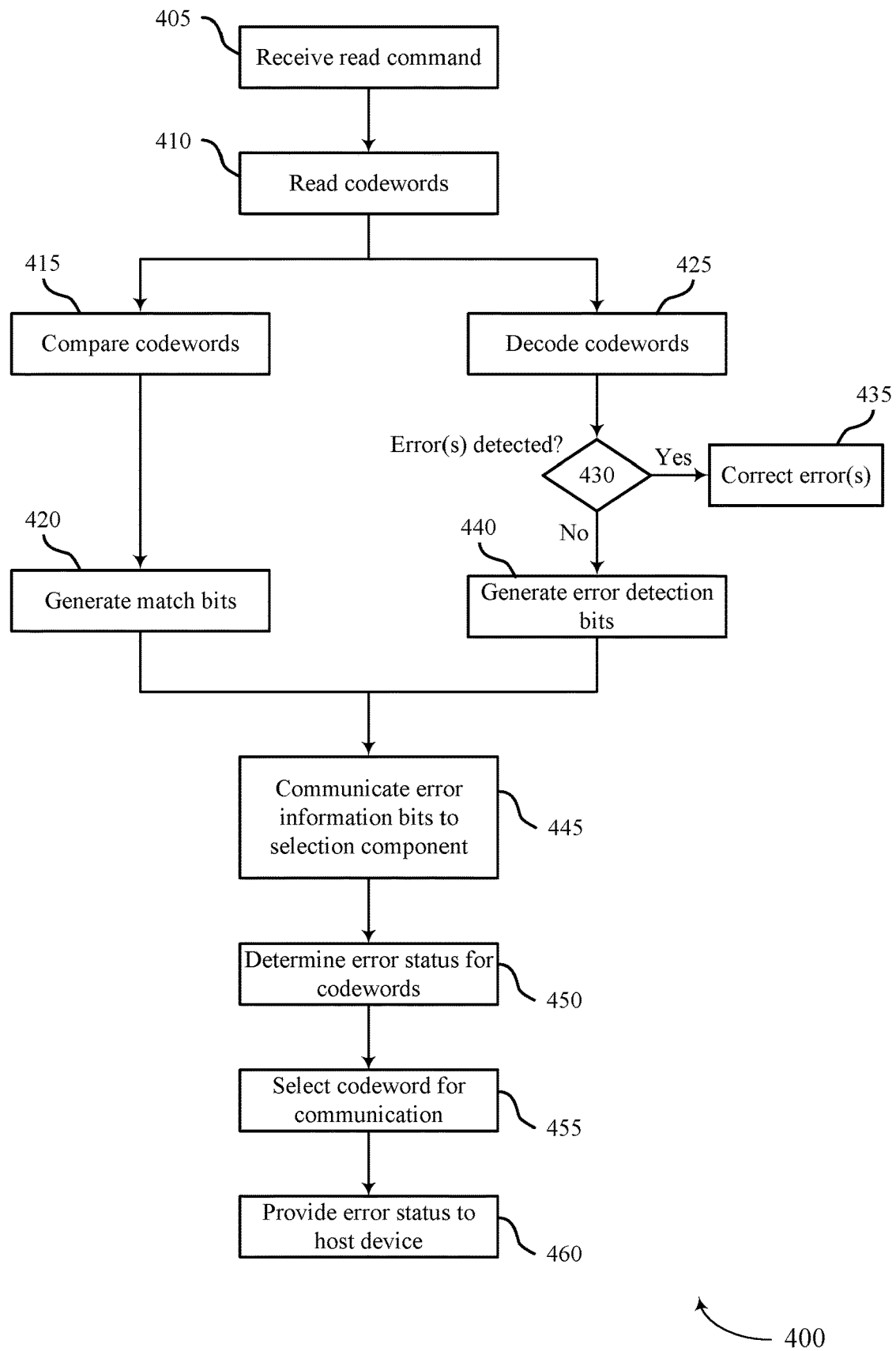
FIG. 4 illustrates an example of a process flow that supports redundancy-based error detection in a memory device in accordance with examples as disclosed herein.

FIG. 4 illustrates an example of a process flow 400 that supports redundancy-based error detection in a memory device in accordance with examples as disclosed herein. Aspects of the process flow 400 may be implemented by a memory device as described herein. For example, aspects of the process flow 400 may be implemented by the memory device 300 as described with reference to FIG. 3. By implementing aspects of the process flow 400, the memory device may determine the error status for codewords associated with a set of data requested by a host device.

Prior to 405, the memory device may receive (e.g., from the host device) a write command for a set of data. In response to the write command, the memory device may generate a first codeword (e.g., codeword A) that includes a first set of parity bits (parity A) and a first set of data bits (data A) that represent the set of data. The memory device may also generate a second codeword (e.g., codeword B) that includes a second set of parity bits (parity B) and a second set of data bits (data B) that represent the set of data. The memory device may then store the first codeword and the second codeword in memory.

At 405, the memory device may receive (e.g., from the host device) a read command for the set of data. At 410, the memory device may read the first codeword (e.g., codeword A) and the second codeword (e.g., codeword B) associated with the set of data. The memory device may read the first codeword and the second codeword based on (e.g., in response to) the read command.

At 415, the memory device may compare the codewords. For example, the memory device may compare (e.g., via the compare engine 320) a first portion (e.g., data A) of the first codeword with a corresponding first portion (e.g., data B) of the second codeword. The memory device may additionally or alternatively compare a second portion (e.g., parity A) of the first codeword with a corresponding second portion (e.g., parity B) of the second codeword. At 420, the memory device (e.g., via the compare engine 320) may generate one or more match bits. For example, the memory device may generate a data match bit that indicates whether there is a mismatch between data A and data B. The memory device may additionally or alternatively generate a parity match bit that indicates whether there is a mismatch between parity A and parity B. A mismatch between two sets of bits may refer to the respective bits in the same bit-position in each set having different values.

At 425, which may overlap partially or wholly in time with 415, the memory device may (e.g., via the ECC engines 315) decode the codewords. For example, the memory device may decode the first codeword (e.g., codeword A) using ECC engine 315-$a$ and may decode the second codeword (e.g., codeword B) using ECC engine 315-$b$. At 430, the memory device may determine (e.g., via the ECC engines 315) whether any errors were detected in the codewords during the decoding. If any error is detected at 430, the memory device may (e.g., via the ECC engines 315), correct the error(s) at 435. For example, if an error is detected in the first codeword (e.g., codeword A) the ECC engine 315-$a$ may correct the error by inverting the bit that is in error. If an error is detected in the second codeword (e.g., codeword B) the ECC engine 315-$b$ may correct the error by inverting the bit that is in error.

At 440, the memory device may generate (e.g., via the ECC engines 315) one or more error detection bits. The error detection bits may be generated based on the decoding. For example, the ECC engine 315-$a$ may generate error detection bit ED_A based on the decoding of the first codeword (e.g., codeword A) to indicate whether an error was detected in the first codeword. Similarly, the ECC engine 315-$b$ may generate error detection bit ED_B based on the decoding of the second codeword (e.g., codeword B) to indicate whether an error was detected in the second codeword.

Because codeword comparison and ECC decoding occur in parallel, the comparison of the codewords is independent of the ECC decoding; and the ECC decoding is independent of the codeword comparison. Put another way, the codewords compared by the comparison engine 320 may not feature any corrections that are made by the ECC engine(s) 215.

At 445, the memory device may communicate the error information bits to the selection component 325. For example, the ECC engines 315 may communicate the error detection bits to the selection component 325 and the compare engine 320 may communicate the match bits to the selection component 325.

At 450, the memory device may (e.g., via the selection component 325) use the effort information bits to determine an error status for the codewords. For example, the memory device may determine an error status for the first codeword (e.g., codeword A) and may determine an error status for the second codeword (e.g., codeword B). The error status for the first codeword may be determined based on the data match bit M_Data, the parity match bit M_Parity, the error detection bit ED_A, or any combination thereof. The error status for the second codeword may be determined based on the data match bit M_Data, the parity match bit M_Parity, the error detection bit ED_B, or any combination thereof. In some examples, the error statuses may be determined based on Table 1.

At 455, the memory device may select (e.g., via the selection component 325) one of the codewords for communication to the host device. For example, the memory device may select codeword A or codeword B for communication to the host device. The memory device may select the codeword for communication based on the error status of the codewords. For example, if one codeword is error-free and the other codeword has an error, the memory device may select the codeword that is error-free for communication to the host device. At 460, the memory device may provide to the host device one or both of the error statuses for the codewords. For example, the memory device may transmit the error statuses or the error information bits to the host device. Alternatively, the memory device may write the error statuses or the information bits to one or more registers at the memory device for the host device to read.

Thus, the memory device may determine the error status for codewords associated with a set of data requested by a host device. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
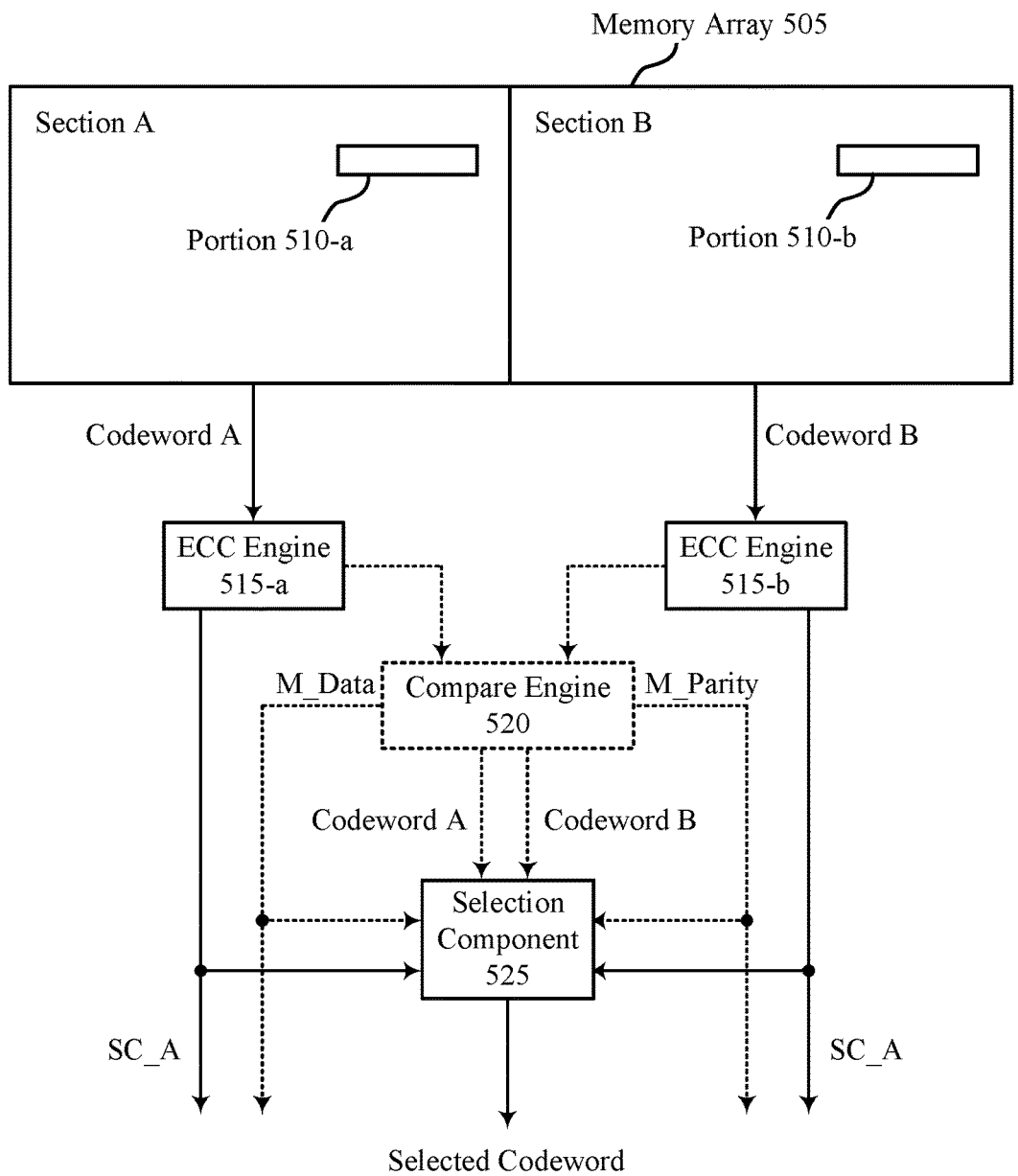
FIG. 5 illustrates an example of a memory device that supports redundancy-based error detection in accordance with examples as disclosed herein.

FIG. 5 illustrates an example of a memory device 500 that supports redundancy-based error detection in accordance with examples as disclosed herein. The memory device 500 may be an example of a memory device as described herein. The memory device 500 may store redundant copies of codewords and use the codewords to generate error information bits that indicate the error statuses of the codewords. The memory device 500 may be configured to support ECC decoding and codeword comparison in series (e.g., one after the other), which may improve diagnostic coverage relative to memory devices (e.g., memory device 300) that support parallel ECC decoding and codeword comparison. The configuration of the memory device 500 may be referred to as the serial configuration.

At a high level, the memory device 500 operate similar to the memory device 300. For example, the memory device 500 may store redundant copies of a codeword in the memory array 505 and may read the codewords from the memory array 505 in response to a read command. However, instead of performing ECC decoding and codeword comparison in parallel, the memory device 500 may perform ECC decoding and codeword comparison serially. For example, the memory device 500 may perform ECC decoding before comparing the codewords so that the compared codewords include any corrections made by the ECC engines. Performing ECC decoding and codeword comparison serially (as opposed to in parallel) may improve diagnostic coverage at the expense of latency.

The memory device 500 may include a memory array 505 that is configured to store information, such as codewords. The memory array 505 may be divided into two sections (e.g., section A and section B) and may be configured to perform the same access operation on the sections, potentially concurrently (e.g., at wholly or partially overlapping times). For example, the memory array 505 may be configured to write a first codeword (e.g., codeword A) to portion 510-a and a second codeword (e.g., codeword B) to portion 510-b. The first codeword may include 1) a first set of data bits (data A) representative of a first copy of a set of data and 2) a first set of parity bits (parity A). The second codeword may include 1) a second set of data bits (data B) representative of a second copy of the set of data and 2) a second set of parity bits (parity B).

An ECC engine 515 may be configured to perform ECC decoding on a codeword and to generate an error detection bit based on the ECC decoding. For example, an ECC engine 515 may perform ECC decoding to detect and correct an error in a codeword (if an error is present). The ECC engine 515 may also generate an error detection bit whose value indicates whether the ECC engine 515 detected an error in the codeword. For instance, ECC engine 515-a may perform ECC decoding on codeword A and may generate error detection bit A (ED_A) for codeword A based on the ECC decoding. Similarly, ECC engine 515-b may perform ECC decoding on codeword B and may generate error detection bit B (ED_B) for codeword B based on the ECC decoding.

The compare engine 520 may be configured to compare codewords received from the ECC engines 515. For example, the compare engine 520 may be configured to compare codeword A, which may be received from ECC engine 515-a, and codeword B, which may be received from ECC engine 515-b. Because the compare engine 520 operates on codewords from the ECC engines 515 (as opposed to codewords received directly from the memory array 505), the codewords operated on by the compare engine 520 may include corrected bits. For example, if ECC engine 515-a detects and corrects a bit in codeword A, the compare engine 520 may perform the comparison on corrected codeword A. If ECC engine 515-b detects and corrects a bit in codeword B, the compare engine 520 may perform the comparison on corrected codeword B.

The compare engine 520 may generate a data match bit (M_Data) that indicates whether there is a mismatch between data A and data B, may generate a parity match bit (M_Parity) that indicates whether there is a mismatch between parity A and parity B, or both. If there is a mismatch in the data bits (e.g., a mismatch between data A and data B), the compare engine 520 may generate data match bit (M_Data) with value '1.' If the data bits match (e.g., if each bit in data A has the same value as a corresponding bit in data B), the compare engine 520 may generate data match bit (M_Data) with value '0.' If there is a mismatch in the parity bits (e.g., a mismatch between parity A and parity B), the compare engine 520 may generate parity match bit (M_Parity) with value '1.' If the parity bits match (e.g., if each bit in parity A has the same value as a corresponding bit in parity B), the compare engine 520 may generate parity match bit (M_Parity) with value '0.' In some examples, the memory device 500 may count the quantity of mismatches between portions of a codeword as described with reference to FIG. 3.

The memory device 500 (e.g., via the selection component 525) may use the error information bits to determine the error statuses for the codewords. For example, the memory device 500 may use Table 2, the error detection bits, the data match bit, and the parity match bit to determine the error status of codeword A and the error status of codeword B.

TABLE 2

Error Status Based on Error Information Bits for Serial Configuration

| M_Data | M_Parity | ED_A | ED_B | A Status | B Status |
|---|---|---|---|---|---|
| 0 | 0 | 0 | 0 | Codeword A error-free | Codeword B error-free |
| 0 | 0 | 0 | 1 | Codeword A error-free | Data B error, parity B error-free |
| 0 | 0 | 1 | 0 | Data A error, parity A error-free | Codeword B error-free |
| 0 | 0 | 1 | 1 | Codeword A error | Codeword B error |
| 0 | 1 | 0 | 0 | Data A error-free, parity A unknown | Data B error-free, parity B unknown |
| 0 | 1 | 0 | 1 | Codeword A error-free | Data B error-free, parity B error |
| 0 | 1 | 1 | 0 | Data A error-free, parity A error | Codeword B error-free |
| 0 | 1 | 1 | 1 | Data A error-free, parity A error | Data B error-free, parity B error |
| 1 | 0 | 0 | 1 | Codeword A error-free | Data B errors, parity B error-free |
| 1 | 0 | 1 | 0 | Data A errors, parity A error-free | Codeword B error-free |
| 1 | 0 | 1 | 1 | Data A error(s), parity A error-free | Data B error(s), parity B error-free |
| 1 | 1 | 0 | 1 | Codeword A error-free | Data B errors, parity B error(s) |
| 1 | 1 | 1 | 0 | Data A errors, parity A error(s) | Codeword B error-free |
| 1 | 1 | 1 | 1 | Data A error(s), parity A error(s) | Data B error(s), parity B error(s) |

The serial configuration of the memory device 500 may allow the memory device 500 to improve diagnostic coverage and comply with more data requests relative to a memory device with the parallel configuration. However, the memory device 500 may take longer to determine the error statuses of the codewords relative to alternative configurations, such as the parallel configuration described with reference to FIG. 3.

In some examples, the compare engine 520 may generate the data match bit (M_Data) but not the parity match bit (M_Parity), which may reduce the complexity of the memory device 500 at the expense of reduced diagnostic coverage (e.g., an inability to distinguish between data errors and parity errors). In such examples, the memory device 500 may use a subset of the error information bits (e.g., the error detection bits and the data match bit) to determine the error statuses for the codewords. For example, the memory device 500 may use Table 3, the error detection bits, and the data match bit to determine the error status of codeword A and the error status of codeword B.

TABLE 3

Error Status Based on ED Bits and Data Match Bit for Serial Configuration

| M_Data | ED_A | ED_B | A Status | B Status |
|---|---|---|---|---|
| 0 | 0 | 0 | Codeword A error-free | Codeword B error-free |
| 0 | 0 | 1 | Codeword A error-free | Codeword B error |
| 0 | 1 | 0 | Codeword A error | Codeword B error-free |
| 0 | 1 | 1 | Codeword A error | Codeword B error |
| 1 | 0 | 1 | Codeword A error-free | Codeword B errors |
| 1 | 1 | 0 | Codeword A errors | Codeword B error-free |
| 1 | 1 | 1 | Codeword A error(s) | Codeword B error(s) |

In some examples, the memory device 500 may generate the error detection bits but not the data match bit (M_Data) or the parity match bit (M_Parity), which may reduce the complexity of the memory device 500 at the expense of reduced diagnostic coverage (e.g., an inability to distinguish between data errors and parity errors). In such examples, the memory device 500 may use a subset of the error information bits (e.g., the error detection bits) to determine the error statuses for the codewords. For example, the memory device 500 may use Table 4, and the error detection bits to determine the error status of codeword A and the error status of codeword B.

TABLE 4

Error Status Based on ED Bits for Serial Configuration

| ED_A | ED_B | A Status | B Status |
|---|---|---|---|
| 0 | 0 | Codeword A error-free | Codeword B error-free |
| 0 | 1 | Codeword A error-free | Codeword B error(s) |
| 1 | 0 | Codeword A error(s) | Codeword B error-free |
| 1 | 1 | Codeword A error(s) | Codeword B error(s) |

The selection component 525 may use Table 2, Table 3, or Table 4 to select between the codewords for communication to the host device. For example, the selection component 525 may determine whether to communicate data A from codeword A or data B from codeword B. In some examples, the selection component 525 may select for communication the codeword with the fewest errors overall or the fewest errors in the data bits.

In addition to communicating the selected data to the host device, the memory device 500 may communicate or otherwise provide an indication of the error status of one or both of the codewords to the host device. In some examples, the memory device 500 may provide the error status(es) by writing the error status(es) to one or more mode registers at the memory device 500 for the host device to read. In other examples, the memory device 300 may provide the error status(es) by writing the error information bits to one or more mode registers at the memory device 500 for the host device to read. The host device may read the mode register(s) periodically or in response to a trigger condition (e.g., receipt of a prompt from the memory device 500).

In some examples, the memory device 500 may provide the error status(es) by transmitting the error status(es) to the host device (e.g., via a communication bus between the memory device 500 and the host device). In other examples, the memory device 500 may provide the error status(es) by transmitting the error information bits to the host device (e.g., via a communication bus between the memory device 500 and the host device). The host device may determine the error status(es) of the codewords based on the indication of the error status(es) provided by the memory device 500 and take one or more actions based on the error status(es).

Thus, the memory device 500 may determine the error statuses of the codewords by storing redundant copies of codewords and using the codewords to generate error information bits.

Figure 6:
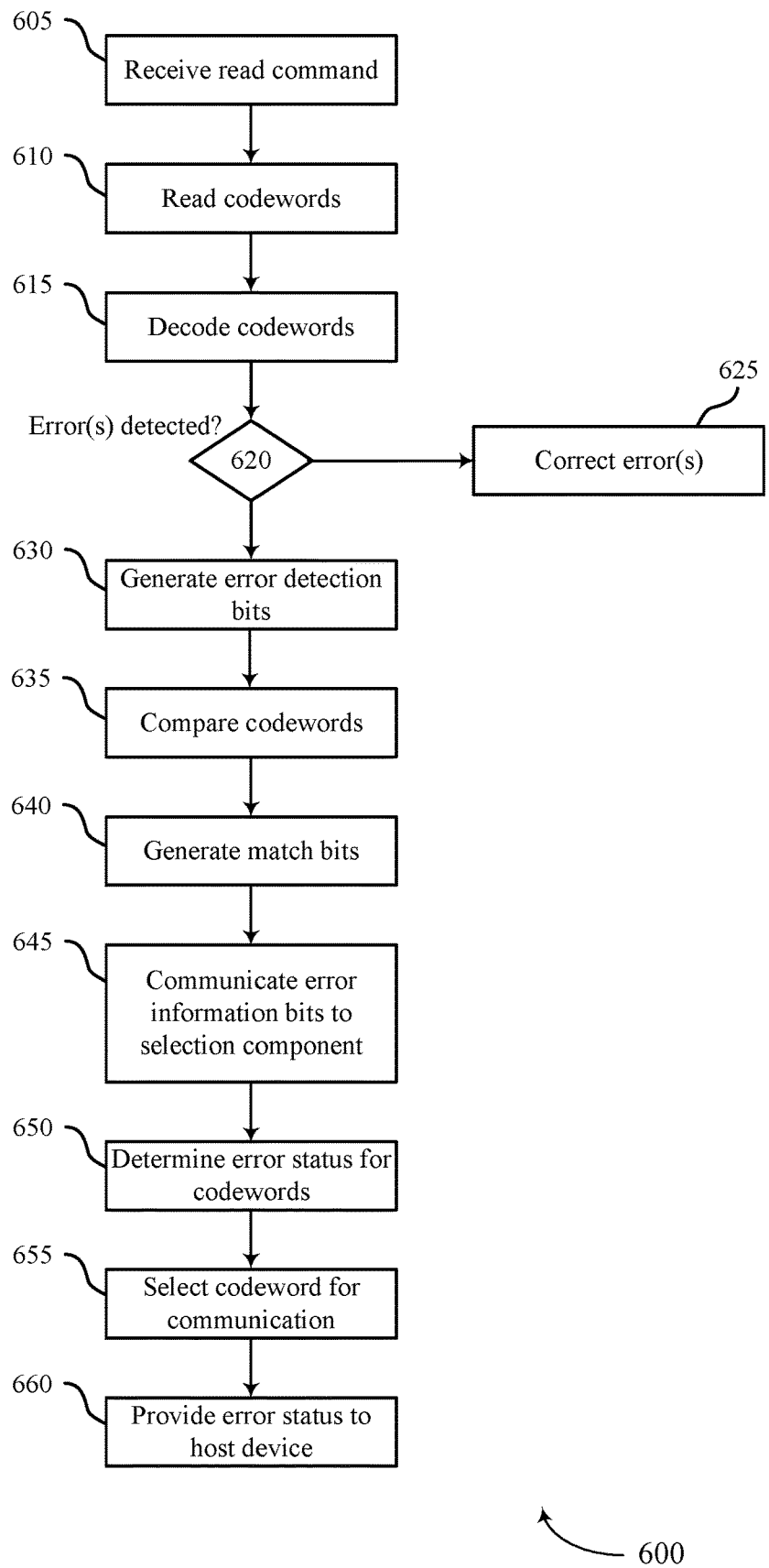
FIG. 6 illustrates an example of a process flow that supports redundancy-based error detection in a memory device in accordance with examples as disclosed herein.

FIG. 6 illustrates an example of a process flow 600 that supports redundancy-based error detection in a memory device in accordance with examples as disclosed herein. Aspects of the process flow 600 may be implemented by a memory device as described herein. For example, aspects of the process flow 600 may be implemented by the memory device 500 as described with reference to FIG. 5. By implementing aspects of the process flow 600, the memory device may determine the error status for codewords associated with a set of data requested by a host device.

Prior to 605, the memory device may receive (e.g., from the host device) a write command for a set of data. In response to the write command, the memory device may generate a first codeword (e.g., codeword A) that includes a first set of parity bits (parity A) and a first set of data bits (data A) that represent the set of data. The memory device may also generate a second codeword (e.g., codeword B) that includes a second set of parity bits (parity B) and a second set of data bits (data B) that represent the set of data. The memory device may then store the first codeword and the second codeword in memory.

At 605, the memory device may receive (e.g., from the host device) a read command for the set of data. At 610, the memory device may read the first codeword (e.g., codeword A) and the second codeword (e.g., codeword B) associated with the set of data. The memory device may read the first codeword and the second codeword based on (e.g., in response to) the read command.

At 615, the memory device may (e.g., via the ECC engines 515) decode the codewords. For example, the memory device may decode the first codeword (e.g., codeword A) using ECC engine 515-*a* and may decode the second codeword (e.g., codeword B) using ECC engine 515-*b*. At 620, the memory device may determine (e.g., via the ECC engines 515) whether any errors were detected in the codewords during the decoding. If any error is detected at 620, the memory device may (e.g., via the ECC engines 515), correct the error(s) at 625. For example, if an error is detected in the first codeword (e.g., codeword A) the ECC engine 515-*a* may correct the error by inverting the bit that is in error. If an error is detected in the second codeword (e.g., codeword B) the ECC engine 515-*b* may correct the error by inverting the bit that is in error.

At 630, the memory device may generate (e.g., via the ECC engines 515) one or more error detection bits. The error detection bits may be generated based on the decoding. For example, the ECC engine 515-*a* may generate error detection bit ED_A based on the decoding of the first codeword (e.g., codeword A) to indicate whether an error was detected in the first codeword. Similarly, the ECC engine 515-*b* may generate error detection bit ED_B based on the decoding of the second codeword (e.g., codeword B) to indicate whether an error was detected in the second codeword.

At 635, the memory device may compare the codewords. For example, the memory device (e.g., via the compare engine 520) compare a first portion (e.g., data A) of the first codeword with a corresponding first portion (e.g., data B) of the second codeword. The memory device may additionally or alternatively compare a second portion (e.g., parity A) of the first codeword with a corresponding second portion (e.g., parity B) of the second codeword. The comparison of the codewords may occur after decoding the codewords so that the compared codewords include any corrections that were made during the decoding.

At 640, the memory device (e.g., via the compare engine 520) may generate one or more match bits. For example, the memory device may generate a data match bit that indicates whether there is a mismatch between data A and data B. The memory device may additionally or alternatively generate a parity match bit that indicates whether there is a mismatch between parity A and parity B.

At 645, the memory device may communicate the error information bits to the selection component 525. For example, the ECC engines 515 may communicate the error detection bits to the selection component 525 and the compare engine 520 may communicate the match bits to the selection component 525.

At 650, the memory device may (e.g., via the selection component 525) use the effort information bits to determine an error status for the codewords. For example, the memory device may determine an error status for the first codeword (e.g., codeword A) and may determine an error status for the second codeword (e.g., codeword B). The error status for the first codeword may be determined based on the data match bit M_Data, the parity match bit M_Parity, the error detection bit ED_A, or any combination thereof. The error status for the second codeword may be determined based on the data match bit M_Data, the parity match bit M_Parity, the error detection bit ED_B, or any combination thereof. In some examples, the error statuses may be determined based on Table 2, Table 3, or Table 4.

At 655, the memory device may (e.g., via the selection component 525) select one of the codewords for communication to the host device. For example, the memory device may select codeword A or codeword B for communication to the host device. The memory device may select the codeword for communication based on the error status of the codewords. For example, if one codeword is error-free and the other codeword has an error, the memory device may select the codeword that is error-free for communication to the host device. At 660, the memory device may provide to the host device one or both of the error statuses for the codewords. For example, the memory device may transmit the error statuses or the error information bits to the host device. Alternatively, the memory device may write the error statuses or the information bits to one or more registers at the memory device for the host device to read.

Thus, the memory device may determine the error status for codewords associated with a set of data requested by a host device. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 7:
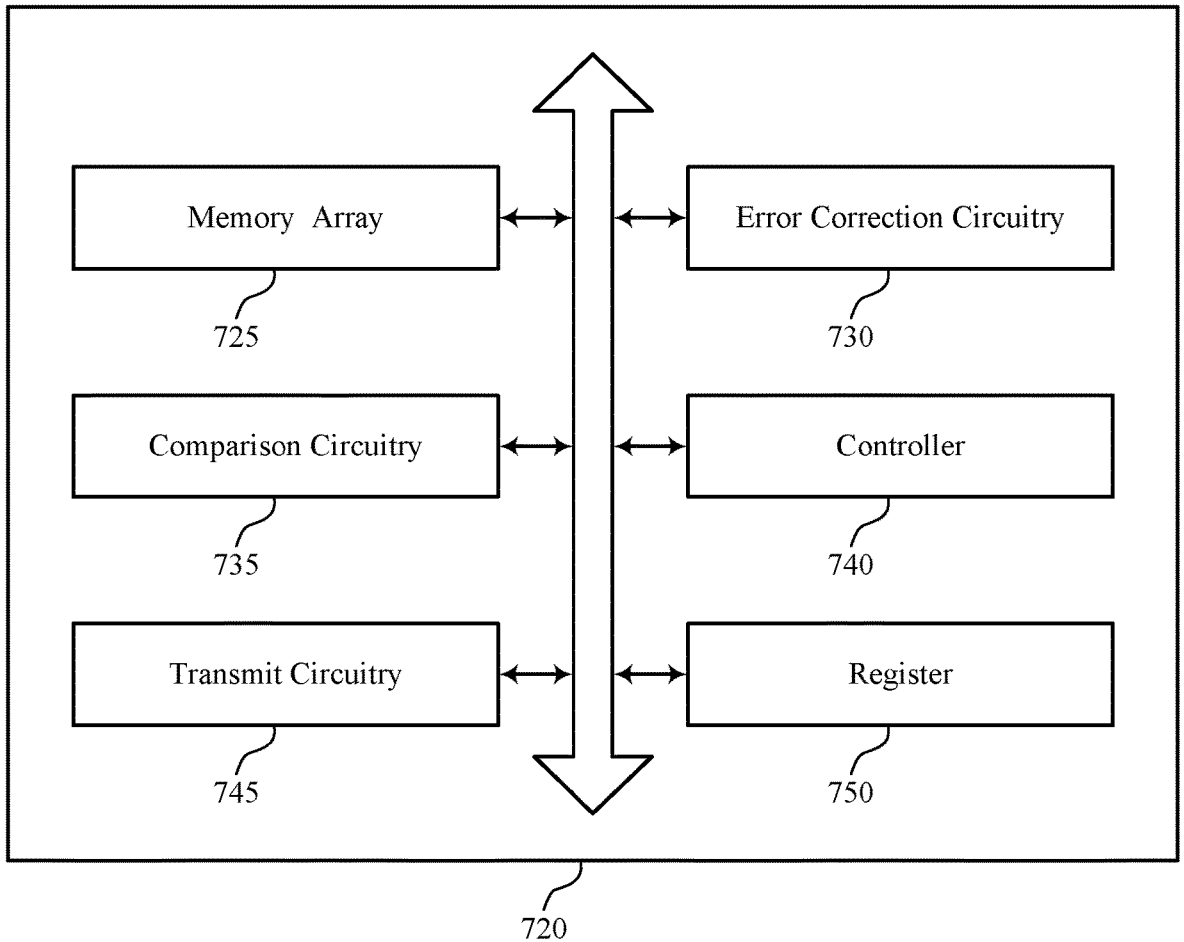
FIG. 7 shows a block diagram of a memory device that supports redundancy-based error detection in accordance with examples as disclosed herein.

FIG. 7 shows a block diagram 700 of a memory device 720 that supports redundancy-based error detection in accordance with examples as disclosed herein. The memory device 720 may be an example of aspects of a memory device as described with reference to FIGS. 1 through 6. The memory device 720, or various components thereof, may be an example of means for performing various aspects of redundancy-based error detection in a memory device as described herein. For example, the memory device 720 may include a memory array 725, an error correction circuitry 730, a comparison circuitry 735, a controller 740, a transmit circuitry 745, a register 750, or any combination thereof. Each of these components may communicate, directly or indirectly, with one another (e.g., via one or more buses).

The memory array 725 may be configured as or otherwise support a means for reading, from memory, a first codeword including a first set of data bits representative of a set of data and a second codeword including a second set of data bits representative of the set of data. The error correction circuitry 730 may be configured as or otherwise support a means for generating, based at least in part on reading the first codeword from memory, an error detection bit that indicates whether an error has been detected in the first codeword. The comparison circuitry 735 may be configured as or otherwise support a means for generating, based at least in part on reading the first codeword and the second codeword from memory, a match bit that indicates whether a portion of the first codeword matches a corresponding portion of the second codeword. The controller 740 may be configured as or otherwise support a means for determining an error status of the first codeword based at least in part on the match bit and the error detection bit.

In some examples, the controller 740 may be configured as or otherwise support a means for selecting between the first set of data bits and the second set of data bits for communication to a host device based at least in part on the error status of the first codeword. In some examples, the transmit circuitry 745 may be configured as or otherwise support a means for communicating the selected first set of data bits or second set of data bits to the host device.

In some examples, the portion of the first codeword includes the first set of data bits and the portion of the second codeword includes the second set of data bits, and the comparison circuitry 735 may be configured as or otherwise support a means for generating, based at least in part on reading the first codeword from memory, a second match bit that indicates whether a first set of parity bits in the first codeword matches a second set of parity bits in the second codeword, where the error status of the first codeword is determined based at least in part on the second match bit.

In some examples, the portion of the first codeword includes a first set of parity bits and the portion of the second codeword includes a second set of parity bits, and the comparison circuitry 735 may be configured as or otherwise support a means for generating, based at least in part on reading the first codeword from memory, a second match bit that indicates whether the first set of data bits matches the second set of data bits, where the error status of the first codeword is determined based at least in part on the second match bit.

In some examples, the error correction circuitry 730 may be configured as or otherwise support a means for decoding the first codeword and the second codeword, where the error detection bit is based at least in part on the decoding. In some examples, the comparison circuitry 735 may be configured as or otherwise support a means for comparing the first set of data bits with the second set of data bits based at least in part on decoding the first codeword and the second codeword, where the match bit is generated based at least in part on the comparison.

In some examples, the error correction circuitry 730 may be configured as or otherwise support a means for correcting an error in the first set of data bits based at least in part on decoding the first codeword, where the first set of data bits is compared with the second set of data bits after correcting the error.

In some examples, the error correction circuitry 730 may be configured as or otherwise support a means for decoding the first codeword and the second codeword, where the error detection bit is based at least in part on the decoding. In some examples, the comparison circuitry 735 may be configured as or otherwise support a means for comparing the first set of data bits with the second set of data bits in parallel with decoding the first codeword and the second codeword, where the match bit is generated based at least in part on the comparison.

In some examples, the error correction circuitry 730 may be configured as or otherwise support a means for generating, based at least in part on reading the second codeword from memory, a second error detection bit that indicates whether an error has been detected in the second codeword. In some examples, the controller 740 may be configured as or otherwise support a means for determining an error status of the second codeword based at least in part on the match bit and the second error detection bit.

In some examples, the controller 740 may be configured as or otherwise support a means for selecting between the first set of data bits and the second set of data bits for communication to a host device based at least in part on the error status of the first codeword and the error status of the second codeword. In some examples, the transmit circuitry 745 may be configured as or otherwise support a means for communicating the selected first set of data bits or second set of data bits to the host device.

In some examples, the register 750 may be configured as or otherwise support a means for providing an indication of the error status of the first codeword to a host device. In some examples, the register 750 may be configured as or otherwise support a means for providing the match bit and the error detection bit to a host device.

Figure 8:
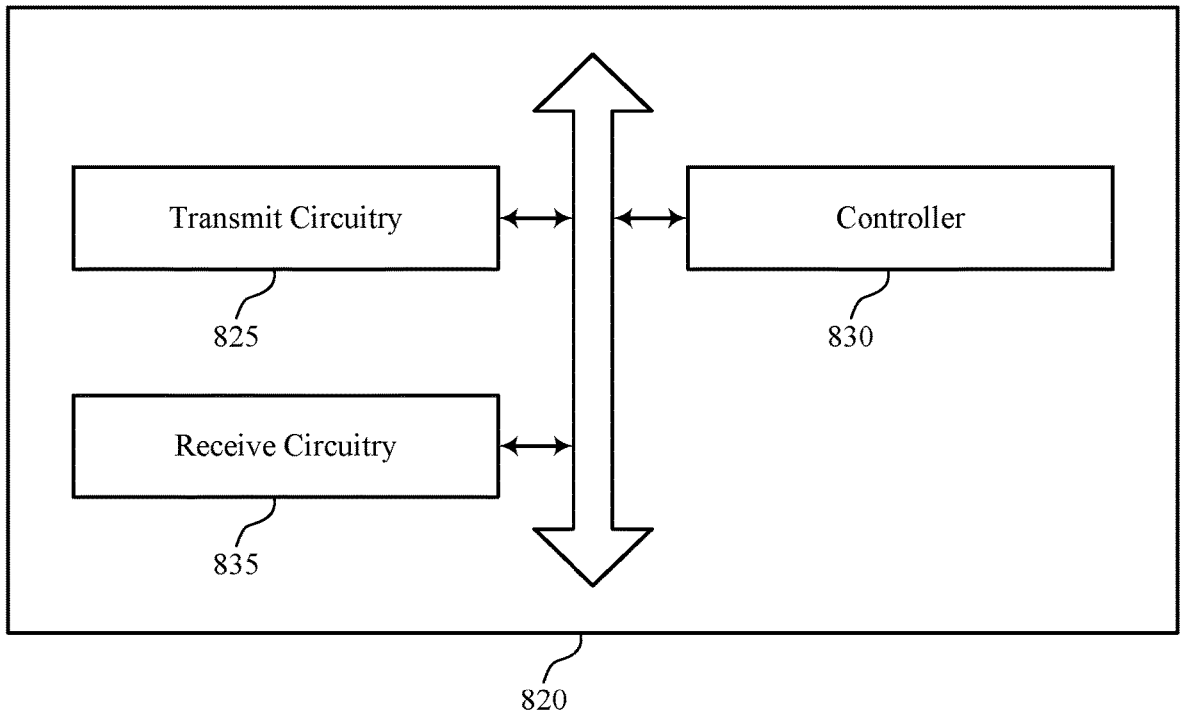
FIG. 8 shows a block diagram of a host device that supports redundancy-based error detection in accordance with examples as disclosed herein.

FIG. 8 shows a block diagram 800 of a host device 820 that supports redundancy-based error detection in accordance with examples as disclosed herein. The host device 820 may be an example of aspects of a host device as described with reference to FIGS. 1 through 6. The host device 820, or various components thereof, may be an example of means for performing various aspects of redundancy-based error detection in a memory device as described herein. For example, the host device 820 may include a transmit circuitry 825, a controller 830, a receive circuitry 835, or any combination thereof. Each of these components may communicate, directly or indirectly, with one another (e.g., via one or more buses).

The transmit circuitry 825 may be configured as or otherwise support a means for transmitting a read command for a set of data that is associated with a first codeword and a second codeword, where the first codeword includes a first set of data bits representative of the set of data, and where the second codeword includes a second set of data bits representative of the set of data. The controller 830 may be configured as or otherwise support a means for determining, based at least in part on transmitting the read command, a match bit that indicates whether a portion of the first codeword matches a corresponding portion of the second codeword, and an error detection bit that indicates whether a memory device detected an error in the first codeword. In some examples, the controller 830 may be configured as or otherwise support a means for determining an error status of the first codeword based at least in part on the match bit and the error detection bit.

In some examples, the error status indicates that the first codeword has an uncorrectable error, and the controller 830 may be configured as or otherwise support a means for entering a safety mode based at least in part on the error status of the first codeword indicating that the first codeword has an uncorrectable error.

In some examples, the portion of the first codeword includes the first set of data bits and the portion of the second codeword includes the second set of data bits, and the controller 830 may be configured as or otherwise support a means for determining, based at least in part on transmitting the read command, a second match bit that indicates whether a first set of parity bits in the first codeword matches a second set of parity bits in the second codeword, where the error status of the first codeword is determined based at least in part on the second match bit.

In some examples, the portion of the first codeword includes a first set of parity bits and the portion of the second codeword includes a second set of parity bits, and the controller 830 may be configured as or otherwise support a means for determining, based at least in part on transmitting the read command, a second match bit that indicates whether the first set of data bits in the first codeword matches the second set of data bits in the second codeword, where the error status of the first codeword is determined based at least in part on the second match bit.

In some examples, the receive circuitry 835 may be configured as or otherwise support a means for receiving the first set of data bits based at least in part on transmitting the read command. In some examples, the controller 830 may be configured as or otherwise support a means for determining that the first set of data bits is error-free based at least in part on the error status.

In some examples, the controller 830 may be configured as or otherwise support a means for reading one or more mode registers included in the memory device, where the match bit and the error detection bit are determined based at least in part on reading the one or more mode registers.

In some examples, the receive circuitry 835 may be configured as or otherwise support a means for receiving an indication of the match bit and the error detection bit from the memory device, where the match bit and the error detection bit are determined based at least in part on receiving the indication.

Figure 9:
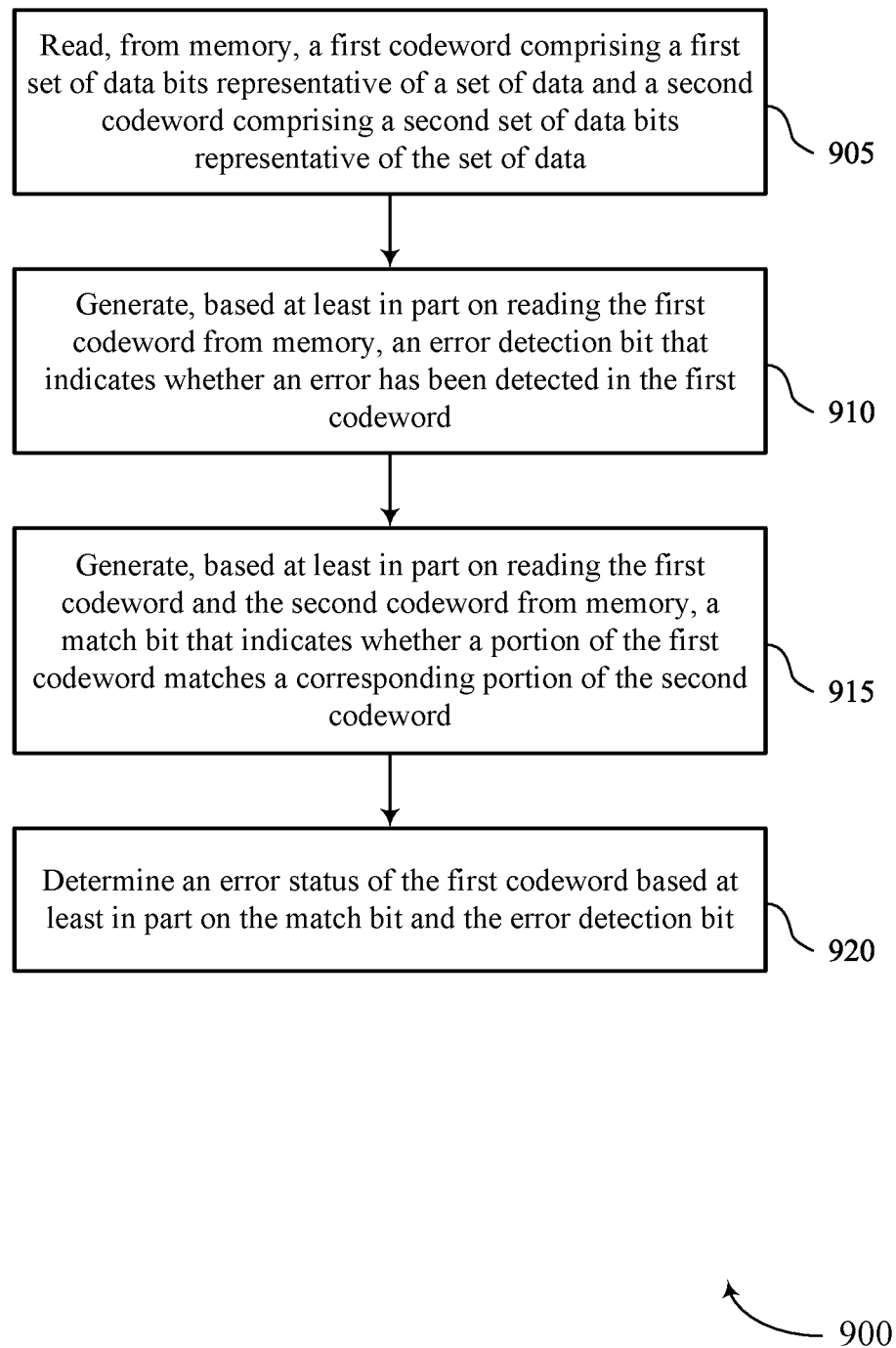
FIGS. 9 and 10 show flowcharts illustrating a method or methods that support redundancy-based error detection in a memory device in accordance with examples as disclosed herein.

FIG. 9 shows a flowchart illustrating a method 900 that supports redundancy-based error detection in a memory device in accordance with examples as disclosed herein. The operations of method 900 may be implemented by a memory device or its components as described herein. For example, the operations of method 900 may be performed by a memory device as described with reference to FIGS. 1 through 7. In some examples, a memory device may execute a set of instructions to control the functional elements of the device to perform the described functions. Additionally, or alternatively, the memory device may perform aspects of the described functions using special-purpose hardware.

At 905, the method may include reading, from memory, a first codeword including a first set of data bits representative of a set of data and a second codeword including a second set of data bits representative of the set of data. The operations of 905 may be performed in accordance with examples as disclosed herein. In some examples, aspects of the operations of 905 may be performed by a memory array 725 as described with reference to FIG. 7.

At 910, the method may include generating, based at least in part on reading the first codeword from memory, an error detection bit that indicates whether an error has been detected in the first codeword. The operations of 910 may be performed in accordance with examples as disclosed herein. In some examples, aspects of the operations of 910 may be performed by an error correction circuitry 730 as described with reference to FIG. 7.

At 915, the method may include generating, based at least in part on reading the first codeword and the second codeword from memory, a match bit that indicates whether a portion of the first codeword matches a corresponding portion of the second codeword. The operations of 915 may be performed in accordance with examples as disclosed herein. In some examples, aspects of the operations of 915 may be performed by a comparison circuitry 735 as described with reference to FIG. 7.

At 920, the method may include determining an error status of the first codeword based at least in part on the match bit and the error detection bit. The operations of 920 may be performed in accordance with examples as disclosed herein. In some examples, aspects of the operations of 920 may be performed by a controller 740 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for reading, from memory, a first codeword including a first set of data bits representative of a set of data and a second codeword including a second set of data bits representative of the set of data; generating, based at least in part on reading the first codeword from memory, an error detection bit that indicates whether an error has been detected in the first codeword; generating, based at least in part on reading the first codeword and the second codeword from memory, a match bit that indicates whether a portion of the first codeword matches a corresponding portion of the second codeword; and determining an error status of the first codeword based at least in part on the match bit and the error detection bit.

Aspect 2: The method, apparatus, or non-transitory computer-readable medium of aspect 1, further including operations, features, circuitry, logic, means, or instructions, or any combination thereof for selecting between the first set of data bits and the second set of data bits for communication to a host device based at least in part on the error status of the first codeword and communicating the selected first set of data bits or second set of data bits to the host device.

Aspect 3: The method, apparatus, or non-transitory computer-readable medium of any of aspects 1 through 2, where the portion of the first codeword includes the first set of data bits and the portion of the second codeword includes the second set of data bits and the method, apparatuses, and non-transitory computer-readable medium further includes operations, features, circuitry, logic, means, or instructions, or any combination thereof for generating, based at least in part on reading the first codeword from memory, a second match bit that indicates whether a first set of parity bits in the first codeword matches a second set of parity bits in the second codeword, where the error status of the first codeword is determined based at least in part on the second match bit.

Aspect 4: The method, apparatus, or non-transitory computer-readable medium of any of aspects 1 through 3, where the portion of the first codeword includes a first set of parity bits and the portion of the second codeword includes a second set of parity bits and the method, apparatuses, and non-transitory computer-readable medium further includes operations, features, circuitry, logic, means, or instructions, or any combination thereof for generating, based at least in part on reading the first codeword from memory, a second match bit that indicates whether the first set of data bits matches the second set of data bits, where the error status of the first codeword is determined based at least in part on the second match bit.

Aspect 5: The method, apparatus, or non-transitory computer-readable medium of any of aspects 1 through 4, further including operations, features, circuitry, logic, means, or instructions, or any combination thereof for decoding the first codeword and the second codeword, where the error detection bit is based at least in part on the decoding and comparing the first set of data bits with the second set of data bits based at least in part on decoding the first codeword and the second codeword, where the match bit is generated based at least in part on the comparison.

Aspect 6: The method, apparatus, or non-transitory computer-readable medium of aspect 5, further including operations, features, circuitry, logic, means, or instructions, or any combination thereof for correcting an error in the first set of data bits based at least in part on decoding the first codeword, where the first set of data bits is compared with the second set of data bits after correcting the error.

Aspect 7: The method, apparatus, or non-transitory computer-readable medium of any of aspects 1 through 6, further including operations, features, circuitry, logic, means, or instructions, or any combination thereof for decoding the first codeword and the second codeword, where the error detection bit is based at least in part on the decoding and comparing the first set of data bits with the second set of data bits in parallel with decoding the first codeword and the second codeword, where the match bit is generated based at least in part on the comparison.

Aspect 8: The method, apparatus, or non-transitory computer-readable medium of any of aspects 1 through 7, further including operations, features, circuitry, logic, means, or instructions, or any combination thereof for generating, based at least in part on reading the second codeword from memory, a second error detection bit that indicates whether an error has been detected in the second codeword and determining an error status of the second codeword based at least in part on the match bit and the second error detection bit.

Aspect 9: The method, apparatus, or non-transitory computer-readable medium of aspect 8, further including operations, features, circuitry, logic, means, or instructions, or any combination thereof for selecting between the first set of data bits and the second set of data bits for communication to a host device based at least in part on the error status of the first codeword and the error status of the second codeword and communicating the selected first set of data bits or second set of data bits to the host device.

Aspect 10: The method, apparatus, or non-transitory computer-readable medium of any of aspects 1 through 9, further including operations, features, circuitry, logic, means, or instructions, or any combination thereof for providing an indication of the error status of the first codeword to a host device.

Aspect 11: The method, apparatus, or non-transitory computer-readable medium of any of aspects 1 through 10, further including operations, features, circuitry, logic, means, or instructions, or any combination thereof for providing the match bit and the error detection bit to a host device.

Figure 10:
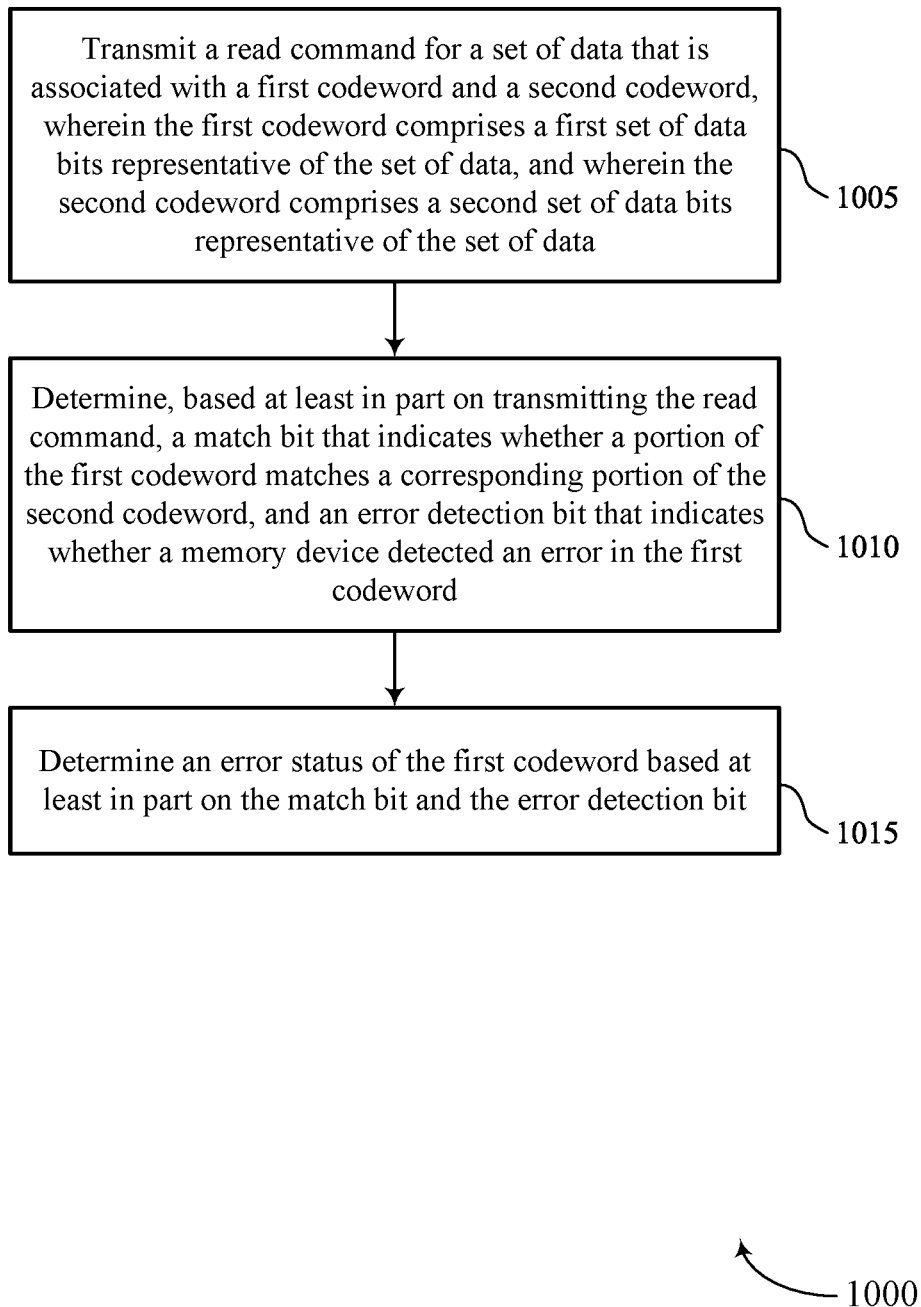

FIG. 10 shows a flowchart illustrating a method 1000 that supports redundancy-based error detection in accordance with examples as disclosed herein. The operations of method 1000 may be implemented by a host device or its components as described herein. For example, the operations of method 1000 may be performed by a host device as described with reference to FIGS. 1 through 6 and 8. In some examples, a host device may execute a set of instructions to control the functional elements of the device to perform the described functions. Additionally, or alternatively, the host device may perform aspects of the described functions using special-purpose hardware.

At 1005, the method may include transmitting a read command for a set of data that is associated with a first codeword and a second codeword, where the first codeword includes a first set of data bits representative of the set of data, and where the second codeword includes a second set of data bits representative of the set of data. The operations of 1005 may be performed in accordance with examples as disclosed herein. In some examples, aspects of the operations of 1005 may be performed by a transmit circuitry 825 as described with reference to FIG. 8.

At 1010, the method may include determining, based at least in part on transmitting the read command, a match bit that indicates whether a portion of the first codeword matches a corresponding portion of the second codeword, and an error detection bit that indicates whether a memory device detected an error in the first codeword. The operations of 1010 may be performed in accordance with examples as disclosed herein. In some examples, aspects of the operations of 1010 may be performed by a controller 830 as described with reference to FIG. 8.

At 1015, the method may include determining an error status of the first codeword based at least in part on the match bit and the error detection bit. The operations of 1015 may be performed in accordance with examples as disclosed herein. In some examples, aspects of the operations of 1015 may be performed by a controller 830 as described with reference to FIG. 8.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for transmitting a read command for a set of data that is associated with a first codeword and a second codeword, where the first codeword includes a first set of data bits representative of the set of data, and where the second codeword includes a second set of data bits representative of the set of data; determining, based at least in part on transmitting the read command, a match bit that indicates whether a portion of the first codeword matches a corresponding portion of the second codeword, and an error detection bit that indicates whether a memory device detected an error in the first codeword; and determining an error status of the first codeword based at least in part on the match bit and the error detection bit.

Aspect 13: The method, apparatus, or non-transitory computer-readable medium of aspect 12, where the error status indicates that the first codeword has an uncorrectable error and the method, apparatuses, and non-transitory computer-readable medium further includes operations, features, circuitry, logic, means, or instructions, or any combination thereof for entering a safety mode based at least in part on the error status of the first codeword indicating that the first codeword has an uncorrectable error.

Aspect 14: The method, apparatus, or non-transitory computer-readable medium of any of aspects 12 through 13, where the portion of the first codeword includes the first set of data bits and the portion of the second codeword includes the second set of data bits and the method, apparatuses, and non-transitory computer-readable medium further includes operations, features, circuitry, logic, means, or instructions, or any combination thereof for determining, based at least in part on transmitting the read command, a second match bit that indicates whether a first set of parity bits in the first codeword matches a second set of parity bits in the second codeword, where the error status of the first codeword is determined based at least in part on the second match bit.

Aspect 15: The method, apparatus, or non-transitory computer-readable medium of any of aspects 12 through 14, where the portion of the first codeword includes a first set of parity bits and the portion of the second codeword includes a second set of parity bits and the method, apparatuses, and non-transitory computer-readable medium further includes operations, features, circuitry, logic, means, or instructions, or any combination thereof for determining, based at least in part on transmitting the read command, a second match bit that indicates whether the first set of data bits in the first codeword matches the second set of data bits in the second codeword, where the error status of the first codeword is determined based at least in part on the second match bit.

Aspect 16: The method, apparatus, or non-transitory computer-readable medium of any of aspects 12 through 15, further including operations, features, circuitry, logic, means, or instructions, or any combination thereof for receiving the first set of data bits based at least in part on transmitting the read command and determining that the first set of data bits is error-free based at least in part on the error status.

Aspect 17: The method, apparatus, or non-transitory computer-readable medium of any of aspects 12 through 16, further including operations, features, circuitry, logic, means, or instructions, or any combination thereof for reading one or more mode registers included in the memory device, where the match bit and the error detection bit are determined based at least in part on reading the one or more mode registers.

Aspect 18: The method, apparatus, or non-transitory computer-readable medium of any of aspects 12 through 17, further including operations, features, circuitry, logic, means, or instructions, or any combination thereof for receiving an indication of the match bit and the error detection bit from the memory device, where the match bit and the error detection bit are determined based at least in part on receiving the indication.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 19: An apparatus, including: a memory; and a controller coupled with the memory and configured to cause the apparatus to: read, from the memory, a first codeword including a first set of data bits representative of a set of data and a second codeword including a second set of data bits representative of the set of data; generate, based at least in part on reading the first codeword from memory, an error detection bit that indicates whether an error has been detected in the first codeword; generate, based at least in part on reading the first codeword and the second codeword from memory, a match bit that indicates whether a portion of the first codeword matches a corresponding portion of the second codeword; and determine an error status of the first codeword based at least in part on the match bit and the error detection bit.

Aspect 20: The apparatus of aspect 19, where the controller is further configured to cause the apparatus to: select between the first set of data bits and the second set of data bits for communication to a host device based at least in part on the error status of the first codeword; and communicate the selected first set of data bits or second set of data bits to the host device.

Aspect 21: The apparatus of any of aspects 19 through 20, where the portion of the first codeword includes the first set of data bits and the portion of the second codeword includes the second set of data bits, and where the controller is further configured to cause the apparatus to: generate, based at least in part on reading the first codeword from memory, a second match bit that indicates whether a first set of parity bits in the first codeword matches a second set of parity bits in the second codeword, where the error status of the first codeword is determined based at least in part on the second match bit.

Aspect 22: The apparatus of any of aspects 19 through 21, where the portion of the first codeword includes a first set of parity bits and the portion of the second codeword includes a second set of parity bits, and where the controller is further configured to cause the apparatus to: generate, based at least in part on reading the first codeword from memory, a second match bit that indicates whether the first set of data bits matches the second set of data bits, where the error status of the first codeword is determined based at least in part on the second match bit.

Aspect 23: The apparatus of any of aspects 19 through 22, where the controller is further configured to cause the apparatus to: decode the first codeword and the second codeword, where the error detection bit is based at least in part on the decoding; and compare the first set of data bits with the second set of data bits based at least in part on decoding the first codeword and the second codeword, where the match bit is generated based at least in part on the comparison.

Aspect 24: The apparatus of aspect 23, where the controller is further configured to cause the apparatus to: correct an error in the first set of data bits based at least in part on decoding the first codeword, where the first set of data bits is compared with the second set of data bits after correcting the error.

Aspect 25: The apparatus of any of aspects 19 through 24, where the controller is further configured to cause the apparatus to: decode the first codeword and the second codeword, where the error detection bit is based at least in part on the decoding; and compare the first set of data bits with the second set of data bits in parallel with decoding the first codeword and the second codeword, where the match bit is generated based at least in part on the comparison.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
reading, from memory, a first codeword comprising a first set of data bits representative of a set of data and a second codeword comprising a second set of data bits representative of the set of data;
generating, based at least in part on reading the first codeword from the memory, an error detection bit that indicates whether an error has been detected in the first codeword;
generating, based at least in part on reading the first codeword and the second codeword from the memory, a match bit that indicates whether a portion of the first codeword matches a corresponding portion of the second codeword; and
determining an error status of the first codeword based at least in part on the match bit and the error detection bit.

2. The method of claim 1, further comprising:
selecting between the first set of data bits and the second set of data bits for communication to a host device based at least in part on the error status of the first codeword; and
communicating the selected first set of data bits or second set of data bits to the host device.

3. The method of claim 1, wherein the portion of the first codeword comprises the first set of data bits and the portion of the second codeword comprises the second set of data bits, the method further comprising:
generating, based at least in part on reading the first codeword from the memory, a second match bit that indicates whether a first set of parity bits in the first codeword matches a second set of parity bits in the second codeword, wherein the error status of the first codeword is determined based at least in part on the second match bit.

4. The method of claim 1, wherein the portion of the first codeword comprises a first set of parity bits and the portion of the second codeword comprises a second set of parity bits, the method further comprising:
generating, based at least in part on reading the first codeword from the memory, a second match bit that indicates whether the first set of data bits matches the second set of data bits, wherein the error status of the first codeword is determined based at least in part on the second match bit.

5. The method of claim 1, further comprising:
decoding the first codeword and the second codeword, wherein the error detection bit is based at least in part on the decoding; and
comparing the first set of data bits with the second set of data bits based at least in part on decoding the first codeword and the second codeword, wherein the match bit is generated based at least in part on the comparison.

6. The method of claim 5, further comprising:
correcting an error in the first set of data bits based at least in part on decoding the first codeword, wherein the first set of data bits is compared with the second set of data bits after correcting the error.

7. The method of claim 1, further comprising:
decoding the first codeword and the second codeword, wherein the error detection bit is based at least in part on the decoding; and
comparing the first set of data bits with the second set of data bits in parallel with decoding the first codeword and the second codeword, wherein the match bit is generated based at least in part on the comparison.

8. The method of claim 1, further comprising:
generating, based at least in part on reading the second codeword from the memory, a second error detection bit that indicates whether an error has been detected in the second codeword; and
determining an error status of the second codeword based at least in part on the match bit and the second error detection bit.

9. The method of claim 8, further comprising:
selecting between the first set of data bits and the second set of data bits for communication to a host device based at least in part on the error status of the first codeword and the error status of the second codeword; and
communicating the selected first set of data bits or second set of data bits to the host device.

10. The method of claim 1, further comprising:
providing an indication of the error status of the first codeword to a host device.

11. The method of claim 1, further comprising:
providing the match bit and the error detection bit to a host device.

12. A method, comprising:
transmitting a read command for a set of data that is associated with a first codeword and a second codeword, wherein the first codeword comprises a first set of data bits representative of the set of data, and wherein the second codeword comprises a second set of data bits representative of the set of data;
determining, based at least in part on transmitting the read command, a match bit that indicates whether a portion of the first codeword matches a corresponding portion of the second codeword, and an error detection bit that indicates whether a memory device detected an error in the first codeword; and determining an error status of the first codeword based at least in part on the match bit and the error detection bit.

13. The method of claim 12, wherein the error status indicates that the first codeword has an uncorrectable error, the method further comprising:
entering a safety mode based at least in part on the error status of the first codeword indicating that the first codeword has an uncorrectable error.

14. The method of claim 12, wherein the portion of the first codeword comprises the first set of data bits and the portion of the second codeword comprises the second set of data bits, the method further comprising:
determining, based at least in part on transmitting the read command, a second match bit that indicates whether a first set of parity bits in the first codeword matches a second set of parity bits in the second codeword, wherein the error status of the first codeword is determined based at least in part on the second match bit.

15. The method of claim 12, wherein the portion of the first codeword comprises a first set of parity bits and the portion of the second codeword comprises a second set of parity bits, the method further comprising:
determining, based at least in part on transmitting the read command, a second match bit that indicates whether the first set of data bits in the first codeword matches the second set of data bits in the second codeword, wherein the error status of the first codeword is determined based at least in part on the second match bit.

16. The method of claim 12, further comprising:
receiving the first set of data bits based at least in part on transmitting the read command; and
determining that the first set of data bits is error-free based at least in part on the error status.

17. The method of claim 12, further comprising:
reading one or more mode registers included in the memory device, wherein the match bit and the error detection bit are determined based at least in part on reading the one or more mode registers.

18. The method of claim 12, further comprising:
receiving an indication of the match bit and the error detection bit from the memory device, wherein the match bit and the error detection bit are determined based at least in part on receiving the indication.

19. A memory system, comprising:
one or more memories; and
one or more controllers coupled with the one or more memories and configured to cause the memory system to:
read, from the one or more memories, a first codeword comprising a first set of data bits representative of a set of data and a second codeword comprising a second set of data bits representative of the set of data;
generate, based at least in part on reading the first codeword from the one or more memories, an error detection bit that indicates whether an error has been detected in the first codeword;
generate, based at least in part on reading the first codeword and the second codeword from the one or more memories, a match bit that indicates whether a portion of the first codeword matches a corresponding portion of the second codeword; and
determine an error status of the first codeword based at least in part on the match bit and the error detection bit.

20. The memory system of claim 19, wherein the one or more controllers is further configured to cause the memory system to:
select between the first set of data bits and the second set of data bits for communication to a host device based at least in part on the error status of the first codeword; and
communicate the selected first set of data bits or second set of data bits to the host device.

21. The memory system of claim 19, wherein the portion of the first codeword comprises the first set of data bits and the portion of the second codeword comprises the second set of data bits, and wherein the one or more controllers is further configured to cause the memory system to:
generate, based at least in part on reading the first codeword from the one or more memories, a second match bit that indicates whether a first set of parity bits in the first codeword matches a second set of parity bits in the second codeword, wherein the error status of the first codeword is determined based at least in part on the second match bit.

22. The memory system of claim 19, wherein the portion of the first codeword comprises a first set of parity bits and the portion of the second codeword comprises a second set of parity bits, and wherein the one or more controllers is further configured to cause the memory system to:
generate, based at least in part on reading the first codeword from the one or more memories, a second match bit that indicates whether the first set of data bits matches the second set of data bits, wherein the error status of the first codeword is determined based at least in part on the second match bit.

23. The memory system of claim 19, wherein the one or more controllers is further configured to cause the memory system to:
decode the first codeword and the second codeword, wherein the error detection bit is based at least in part on the decoding; and
compare the first set of data bits with the second set of data bits based at least in part on decoding the first codeword and the second codeword, wherein the match bit is generated based at least in part on the comparison.

24. The memory system of claim 23, wherein the one or more controllers is further configured to cause the memory system to:
correct an error in the first set of data bits based at least in part on decoding the first codeword, wherein the first set of data bits is compared with the second set of data bits after correcting the error.

25. The memory system of claim 19, wherein the one or more controllers is further configured to cause the memory system to:
decode the first codeword and the second codeword, wherein the error detection bit is based at least in part on the decoding; and
compare the first set of data bits with the second set of data bits in parallel with decoding the first codeword and the second codeword, wherein the match bit is generated based at least in part on the comparison.

* * * * *